United States Patent
Katz et al.

(10) Patent No.: US 9,667,887 B2
(45) Date of Patent: May 30, 2017

(54) LENS DISTORTION METHOD FOR BROADCAST VIDEO

(75) Inventors: Sheldon Katz, Ringoes, NJ (US); Gregory House, Doylestown, PA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 676 days.

(21) Appl. No.: 12/950,525

(22) Filed: Nov. 19, 2010

(65) Prior Publication Data
US 2011/0128377 A1    Jun. 2, 2011

Related U.S. Application Data

(60) Provisional application No. 61/263,346, filed on Nov. 21, 2009.

(51) Int. Cl.
| | | |
|---|---|---|
| H04N 7/18 | (2006.01) | |
| H04N 5/272 | (2006.01) | |
| H04N 5/217 | (2011.01) | |
| H04N 5/357 | (2011.01) | |

(52) U.S. Cl.
CPC ............ H04N 5/272 (2013.01); H04N 5/217 (2013.01); H04N 5/2723 (2013.01); H04N 5/3572 (2013.01)

(58) Field of Classification Search
CPC .......................... G06T 7/0018; H04N 5/23238
See application file for complete search history.

(56) References Cited

U.S. PATENT DOCUMENTS

| | | | |
|---|---|---|---|
| 5,264,933 A | | 11/1993 | Rosser et al. |
| 5,808,695 A | * | 9/1998 | Rosser et al. ................ 348/584 |
| 5,982,549 A | * | 11/1999 | Kubala et al. ............... 359/618 |
| 6,100,925 A | | 8/2000 | Rosser et al. |
| 6,173,087 B1 | * | 1/2001 | Kumar et al. ................ 382/284 |
| 6,208,386 B1 | * | 3/2001 | Wilf et al. .................... 348/578 |
| 6,529,613 B1 | | 3/2003 | Astle |
| 2002/0158873 A1 | * | 10/2002 | Williamson ................. 345/427 |
| 2003/0081813 A1 | * | 5/2003 | Astle ............................ 382/103 |
| 2005/0122400 A1 | * | 6/2005 | Kochi et al. ............ 348/207.99 |

(Continued)

OTHER PUBLICATIONS

U.S. Appl. No. 12/403,857, filed Mar. 13, 2009 (pp. 1-44).

(Continued)

*Primary Examiner* — Zhubing Ren
(74) *Attorney, Agent, or Firm* — Fay Kaplun & Marcin, LLP

(57) ABSTRACT

A method, apparatus, and computer program product are described to improve a lens distortion curve which roughly approximates distortion caused by a camera lens to capture an event onto video. The present invention selects a generic lens distortion curve that roughly approximates the distortion caused by the camera lens while capturing the event onto the video. The video as well as information from the generic lens distortion curve is used to generate a camera model. This camera model is used to integrate virtual insertions into the video. If the camera model is sufficiently accurate to present a realistic appearance of the virtual insertions to the remote viewer, this camera model is then used to integrate more virtual insertions into the video. However, if the camera model is not sufficiently accurate, an iterative process is employed to refine this camera model.

28 Claims, 5 Drawing Sheets

(56) References Cited

U.S. PATENT DOCUMENTS

2006/0063574 A1* 3/2006 Richardson et al. ............. 463/1
2008/0291282 A1* 11/2008 Fitzgibbon et al. .......... 348/187
2009/0180008 A1* 7/2009 Williams et al. ............. 348/241
2010/0238351 A1 9/2010 Shamur et al.

OTHER PUBLICATIONS

U.S. Appl. No. 12/879,482, filed Sep. 10, 2010 (pp. 1-37).
U.S. Appl. No. 12/909,508, filed Oct. 21, 2010 (pp. 1-43).
"Standard Operating Procedure for Camera Calibration" PVI Virtual Media Services, Apr. 12, 2005, pp. 1-19.

* cited by examiner

LENS DISTORTION METHOD FOR BROADCAST VIDEO

CROSS-REFERENCE TO RELATED APPLICATIONS

The present application claims the benefit of U.S. Provisional Patent Appl. No. 61/263,346, filed Nov. 21, 2009, which is incorporated by reference herein in its entirety.

BACKGROUND OF THE INVENTION

Field of the Invention

The present invention relates to integrating virtual insertions into a video depicting an event, and more specifically to enhancing the integration of the virtual insertions by correcting for distortion caused by a lens of a camera capturing the event.

Related Art

An event, such as a sporting contest, a musical concert, a speech, a movie, a television sitcom, or a television reality show to provide some examples, may be captured by a broadcaster onto a video using one or more cameras. The video is subsequently broadcasted by the broadcaster to a remote viewer. The remote viewer observes the video near live as the event is happening in real-time, or after the event is complete, using a television platform, an internet platform, and/or a mobile platform to provide some examples.

Commonly, the broadcaster integrates virtual insertions, such as virtual graphics to provide an example, with the video using a virtual insertion and enhancement system to enhance observation of the event by the remote viewer. An example of such a virtual insertion and enhancement system is described in U.S. patent application Ser. No. 07/826,754, filed on Jan. 28, 1992, now U.S. Pat. No. 5,264,933, which is incorporated by reference in its entirety.

Performance of this virtual insertion and enhancements system can be limited by many factors. One such factor, commonly referred to as camera lens distortion, relates to unwanted distortion present in the video resulting from a lens of a camera capturing the event as it occurs. Conventional techniques to correct for the camera lens distortion may involve subsequent removal of the camera lens distortion from the video through a calibration process using calibration targets. This calibration process uses distortion curves having distortion constants as functions of zoom, focus, image distance, focal length, magnification, field of view, or other parameters to correct for the camera lens distortion in the video.

For many virtual insertion and enhancement applications, it may be necessary or desirable for these systems to operate with minimum setup time. A venue hosting the event may not provide support for the calibration process prior to the event. For example, the broadcaster may not be provided pre-event shots with the calibration targets. Additionally, the venue hosting the event may not provide enough time prior to the event to properly calibrate the camera lens or may allow enough time and resources for some aspects of the calibration but not others. Some events, like sporting contests to provide an example, may not have adequate event lighting necessary for calibration until close to a starting time of the event.

Thus, there is a need for an apparatus and/or a method to generate adequate lens distortion models or curves without time and resource consuming lens calibrations that overcomes the shortcomings described above. Further aspects and advantages of the present invention will become apparent from the detailed description that follows.

BRIEF DESCRIPTION OF THE FIGURES

The present invention is described with reference to the accompanying drawings. In the drawings, like reference numbers indicate identical or functionally similar elements. The drawing in which an element first appears is indicated by the left-most digit in the corresponding reference number.

The present embodiments will now be described with reference to the accompanying drawings. In the drawings, like reference numbers may indicate identical or functionally similar elements.

DETAILED DESCRIPTION OF THE INVENTION

The following Detailed Description refers to accompanying drawings to illustrate exemplary embodiments consistent with the invention. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to effect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the invention. Therefore, the Detailed Description is not meant to limit the invention. Rather, the scope of the invention is defined only in accordance with the following claims and their equivalents.

An event, such as a sporting contest, a musical concert, a speech, a movie, a television sitcom, a television reality show, and/or any other suitable occurrence that may be captured onto video to provide some examples, may be viewed by an actual viewer that is physically present to observe the occurrence of the event or by a remote viewer.

A broadcaster broadcasts a video depicting the event near live as the event is happening in real-time, or after the event is complete, to the remote viewer. The remote viewer observes the event using a television platform, an internet platform, a mobile platform, and/or any other suitable platform that is capable of displaying the video. Commonly, the broadcaster integrates virtual insertions, such as virtual graphics to provide an example, with the video using a virtual insertion and enhancement system to improve observation of the event by the remote viewer. The broadcaster integrates the virtual insertions with the video such that these virtual insertions appear realistic, namely appear to be a physical part of the event, to the remote viewer.

Exemplary Virtual Insertion System for Broadcast Video

Figure 1:
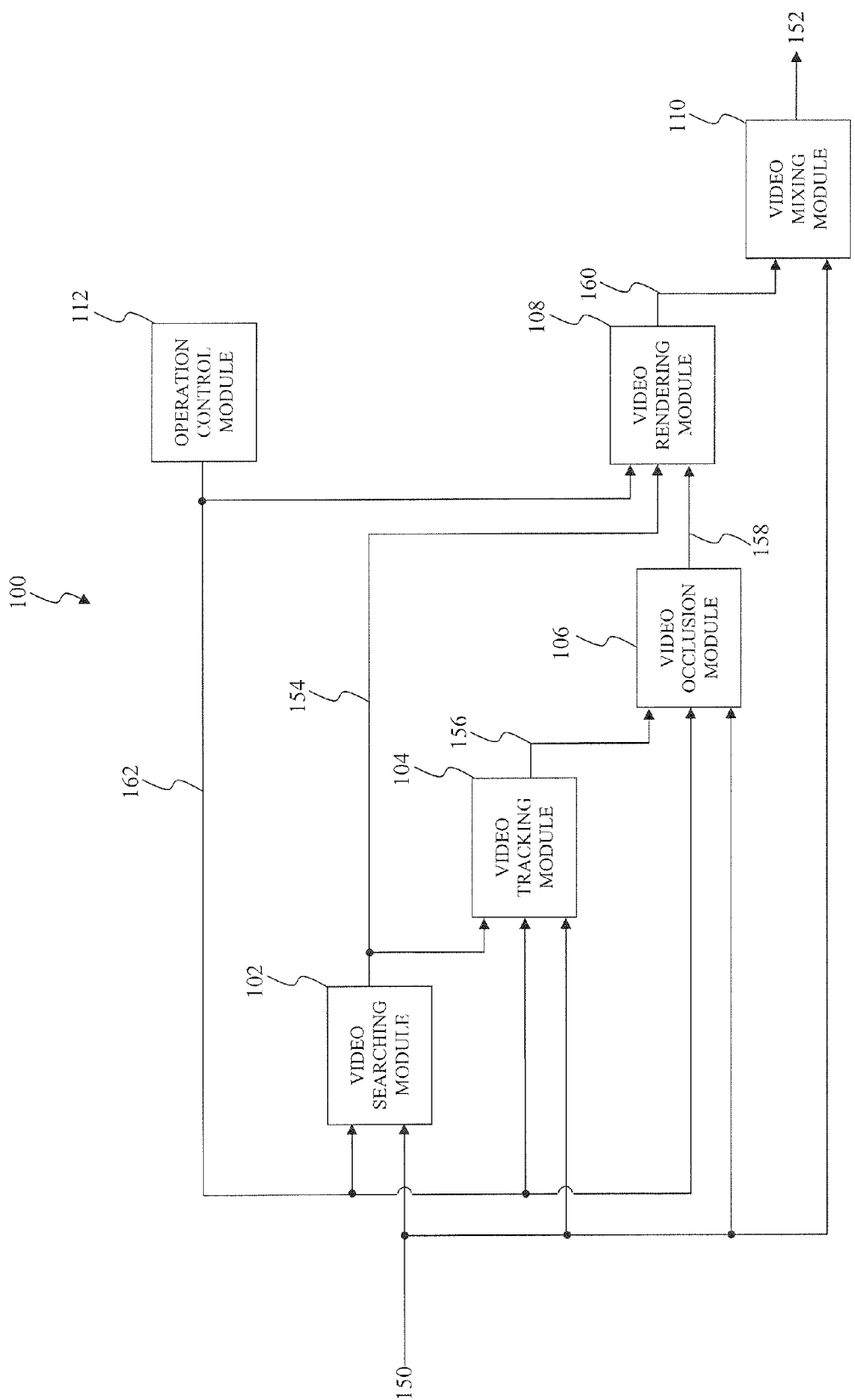
FIG. 1 illustrates a block diagram of a virtual insertion system for broadcast video according to an exemplary embodiment of the present invention.

FIG. 1 illustrates a block diagram of a virtual insertion system for broadcast video according to an exemplary embodiment of the present invention. A virtual insertion system 100 integrates virtual insertions, such as virtual graphics to provide an example, into a video feed 150 representing one or more video frames of an event, such as a sporting contest, a musical concert, a speech, a movie, a television sitcom, a television reality show, and/or any other suitable occurrence that may be captured onto video to provide some examples, to provide a video scene 152. The video insertion system 100 includes a video searching module 102, a video tracking module 104, a video occlusion module 106, a video rendering module 108, a video mixing module 110, and an operational control module 112.

The video searching module 102 analyzes the video feed 150 to determine an orientation of a camera capturing the event, and/or transitions between multiple cameras capturing the event to provide camera tracking data 154. The video feed 150 may be received from a video production such as a dedicated feed from the camera capturing the event, an isolated point of view of the camera, and/or a program feed which cuts among video from among multiple cameras to provide some examples. The video searching module 102 may provide the camera tracking data 154 over a network such a wireless and/or wired network such as Ethernet to provide an example.

The video searching module 102 may additionally analyze the video feed 150 for one or more landmarks to provide a representation of the pan, tilt, and zoom (PTZ) of the video feed 150. The video searching module 102 may provide the representation of the PTZ with respect to a location point in a scene depicted in the video feed 150. This representation of the PTZ may be combined with an orientation of a camera capturing the event and/or the transitions between multiple cameras capturing the event to provide a camera model as the camera tracking data 154.

The camera model may indicate the orientation of the camera and/or any other suitable parameter that will be apparent to those skilled in the relevant art(s) without departing from the spirit and scope of the present invention which may enable the camera to be located in reference to the scene depicted in the video feed 150. The camera model may indicate one or more camera parameters that relate to physical measurements of the camera such as pan, tilt, roll, image distance, x position, y position, z position, focus, lens distortion, and/or any other any other suitable parameter that will be apparent to those skilled in the relevant art(s) without departing from the spirit and scope of the present invention. The camera parameters may be derived from data collected using instrumentation connected to the camera, may be derived based on visual analysis of the video feed 150, and/or any combination thereof.

The camera model may represent a homographic relation between a field of view of the camera and a physical reference in the video feed 150. Alternatively, the camera model may represent a homographic mapping between the field of view of the camera and a reference image of the scene depicted in the video feed 150, wherein the reference image is used to define a location of the virtual insertions. The elements or parameters of this homographic mapping may be considered camera data parameters. In another alternate, the camera model may be a representation of the location of an object, a group of objects, or a portion of the scene depicted in the video feed 150. Further discussion of the camera model is given in U.S. patent application Ser. No. 12/879,482, filed on Sep. 10, 2010, which is incorporated by reference herein in its entirety.

The video searching module 102 may further update a camera position, or the position of the multiple cameras, over time through frame to frame analysis of features in the video feed 150, such as a texture analysis method as described in U.S. patent application Ser. No. 08/580,892, filed on Dec. 29, 1995, now U.S. Pat. No. 5,808,695, and U.S. patent application Ser. No. 09/308,949, filed on May 26, 1999, now U.S. Pat. No. 6,529,613, each of which is incorporated by reference herein in its entirety. Alternatively, the video searching module 102 may rely on PTZ sensors on the camera or a combination of sensors and image stabilization as described in U.S. patent application Ser. No. 09/230,099, filed on Jan. 19, 1999, now U.S. Pat. No. 6,100,925, which is incorporated by reference herein in its entirety.

The video tracking module 104 may detect and/or track virtual insertions and/or physical objects in the video feed 150 based upon the camera tracking data 154. The physical objects represent objects within the event that are capable of being viewed by the actual viewer that are depicted in the video feed 150. The virtual graphics represents graphics within the event that are capable of being viewed by the remote viewer which have been previously integrated into the video feed 150.

The video tracking module 104 provides tracking information 156 indicative of whether the virtual insertions and/or the physical objects have been detected and, optionally, their location within the scene depicted in the video feed 150. For example, the tracking information 156 may indicate of a presence of the virtual insertions and/or the physical objects. The video tracking module 104 may detect and/or track static and/or dynamic objects, and/or portions thereof. The objection tracking module 504 may automatically detect and/or track static and/or dynamic objects, and/or portions thereof, in a background having a consistent color signature, referred to as a simple background, as described in U.S. patent application Ser. No. 12/403,857, filed on Mar. 13, 2009, which is incorporated by reference herein in its entirety. Alternatively, the objection tracking module 504 may automatically detect static and/or dynamic objects, and/or portions thereof, in a background having a varying color signature, referred to as a complex background, as described in U.S. patent application Ser. No. 12/909,508, filed on Oct. 21, 2010, which is incorporated by reference herein in its entirety.

The video occlusion module 106 generates an occlusion key 158 in response to the tracking information 156 to allow for proper integration of the virtual insertions into the video feed 150. The occlusion key 158 may correspond to a shape and/or a location of virtual insertions and/or physical objects to be integrated into the video feed 150 and/or a shape and/or a location of virtual insertions and/or physical objects which have been previously integrated into the video feed 150. The occlusion key 158 may represent a suppression key to suppress regions in the video feed 150 and/or an extraction key to extract the regions in the video feed 150. Further discussion of the video occlusion module 106 is given in U.S. patent application Ser. No. 12/909,508, filed on Oct. 21, 2010, which is incorporated by reference herein in its entirety.

The video rendering module 108 realistically formats virtual insertions such that these virtual graphics are adjusted to match their respective locations in the video feed 150 based upon the camera tracking data 154 to provide a rendered virtual insertion 160. The video rendering module 510 may generate a graphical presentation by rendering a graphical insert into a region of interest of the video feed 150 in a position corresponding to a physical object in the video feed 150. The graphical insert, or a portion thereof, may appear to track with the physical object, such as a ring tracking a physical object or an arrow pointing to the physical object where only the point of the arrow tracks the physical object to provide some examples. The graphical insert may appear to track with a background scene of the video feed 150 and represent a path or a trail of the physical object moving across the background scene. The graphical insert may represent a three dimensional trajectory of the physical object, and appear locked in three dimensional space as the camera moves. Alternatively, the graphical insert may appear to be overlaid on a two dimensional surface of the display screen, and may appear to track with movements of the physical object. In an exemplary embodiment, telestration graphics that diagrams the movements of the physical object are integrated into the background scene of the video feed 150. In this exemplary embodiment, the occlusion key 158 suppresses foreground objects, namely those objects in front of a location of the telestration graphics, within the video feed 150 so that they appear to be in front of the graphic. The telestration graphics may be positioned and/or generated, in part, based on user commands captured using a manual interface, such as a touch screen, mouse, gaming device, tablet, and/or any other suitable device that will be apparent to those skilled in the relevant art(s) without departing from the spirit and scope of the present invention.

The operational control module 112 provides a control signal 162 to enable monitoring and/or correction of the operation of the video insertion system 500. The operational control module 112 may provide feedback of the video tracking module 502 with diagnostics overlaid on a video window. The operational control module 112 may additionally allow monitoring of the tracking information 554 with an option to select information from an object of interest from the video feed 550. The operational control module 112 may also enable the selection of graphics or statistics and the monitoring of results within the video tracking module 104 or the video rendering module 108.

The operational control module 112 may control the video searching module 102, the video tracking module 104, the video occlusion module 106, and the video rendering module 108 over a network such a wireless and/or wired network such as Ethernet to provide an example. The operational control module 112 may include an operator interface that allows an operator to manually determine a location of possible on-screen graphics before and/or during the event. For example, during the event, the operator may indicate the presence of a particular graphic through a manual interface such as a key pad, a mouse, a touch screen device, and/or any other suitable device that will be apparent to those skilled in the relevant art(s) without departing from the spirit and scope of the present invention.

Correction of Camera Lens Distortion

Accurate camera models may be needed to accurately place virtual insertions into the video to present a realistic appearance to the remote viewer. For example, accurate camera models are needed to integrate advertising logos on glass panels behind hockey goals in a video depicting a hockey contest such that these logos appear to be integral to the glass panels. However, camera model errors, resulting from distortion caused by a lens of the camera, commonly referred to as camera lens distortion, to provide an example, may make the virtual insertions appear beyond their intended location within the video and, consequentially, have an unrealistic appearance to the remote viewer. For example, the camera lens distortion may cause the advertising logos to appear beyond the glass panels.

For many types of lenses used in broadcast video productions, general distortion characteristics of these lenses may be known. These general distortion characteristics may be graphically illustrated using a lens distortion curve. The lens distortion curve as described herein defines how lens distortion constants may vary with other parameters such as magnification, for example. A curve may include one or more graphical curves or data sets. For example, the lens distortion curve may include third order radial distortion constants as a function of magnification or may include both third order and fifth order radial distortion constants as functions of magnification, among other combinations. Many families of lenses share common characteristics. For example, it may be known a priori that telephoto lenses are used where third order radial lens distortion accounts for a large percentage of the camera lens distortion and that distortion is negligible over a particular zoom range. In another example, it may be known that the camera lens distortion among related lens models reduces at longer focal lengths beyond a particular range in a similar way. In a further example, lens distortion curves for particular lens models may have similar shapes but differ in start and end point abscissa values plus minimum and maximum ordinate values.

For many applications, it may be possible to approximate adequate lens distortion curves using knowledge and experience gained from previous similar broadcasts. Data about particular lenses and lens families may be derived at broadcast venues and applied to determine lens distortion characteristics needed for a new venue of interest. Such data may comprise camera locations and distances, scene framing, lens types and models, lens distortion, and/or any other suitable characteristic that will be apparent to those skilled in the relevant art(s) from the teachings herein without departing from the spirit and scope of the present invention. Statistics derived from manufacturers' distortion curves and other data may be used as well. Generic lens distortion curves may be formulated which include distortion constants as functions of zoom, focus, image distance, focal length, magnification, field of view, or any other suitable parameter, or combination of parameters, used by camera models that will be apparent to those skilled in the relevant art(s) from the teachings herein without departing from the spirit and scope of the present invention. For example, some video insertion systems may use lens distortion constants as a function of scene magnification. Generic lens distortion curves may need to be tested extensively for various applications and conditions to fully characterize performance and limitations. When used properly, these generic curves can provide adequate accuracy for virtual insertions for many applications and may support a range of applications and venues.

For example, the broadcaster may use relatively good quality lenses with relatively low distortion constants for large camera distances (long focal lengths) and tight framing to capture the event. Constraints may be formulated to limit scenes for which virtual insertions are used, but for many applications such constraints may not be needed. Many broadcast productions may normally limit lens operation to ranges which conform to performance requirements.

Although adequate camera models may be obtained using generic lens distortion curves, more accurate models may be obtainable using calibration targets or grids, for example, but broadcasters may not be provided adequate support for such methods. A venue hosting the event may not provide support for the calibration process prior to the event. For example, the broadcaster may not be provided pre-event shots with the calibration targets. As another example, the venue hosting the event may not provide enough time prior to the event to properly calibrate the camera lens or may allow enough time and resources for some aspects of the calibration but not others. Some events, like sporting contests to provide an example, may not have adequate event lighting necessary for calibration until close to a starting time of the event. As a further example, the video may not be available for analysis until the event is about to begin. In a yet further example, broadcasters may need to do other pre-event setups or calibrations and not have enough time for a lens distortion calibration.

In an exemplary embodiment, a broadcaster may want to insert advertising logos into a video depicting a hockey contest. The hockey contest may be played at an upstream venue and a broadcast signal received at a downstream studio, which may be remote to the venue hosting to the hockey contest, where advertising logos are virtually integrated with the video. Commonly, lighting for the venue may not be available until right before the event is to begin or the video depicting the event may not be available until just before the event is to begin. However, the virtual insertion system may require time to setup to adjust parameters for object recognition, occlusion processing, and other processing requirements. There may not be enough time or resources to do a lens distortion calibration. It may be important for the broadcaster to have the system fully functional at the start of the event, precluding the possibility of calibrating during the event itself.

In these situations, broadcasts may rely on a generic lens distortion curve to facilitate capturing the event onto the video. For example, an operator may be aware of productions for similar events at similar venues using lenses having magnification factors between 55× and 80×, as an example, or may be aware of a particular lens model being used, such as a Canon™ 72× to provide example. However, these examples are not limiting, those skilled in the relevant art(s) will recognize that other lens having other magnification factors may be similarly used without departing from the spirit and scope of the present invention. In this example, the operator may select a generic lens distortion curve from a list of such curves, such as selecting a generic Canon™ 70× curve, for example, which would provide sufficient, but not ideal, performance for the application. The operator may not even know whether the lens was a Canon™ 72× or a Fujinon™ 70×, for example, but may know that the generic Canon™ 70× curve would work for either case for the application at hand. In some cases where limited pre-event shots are available, the operator may try a few different generic curves and select the one which gave the best performance. This may be more expedient than doing a lens distortion calibration or a lens distortion calibration may not be possible with the limited pre-event shots.

Figure 2:
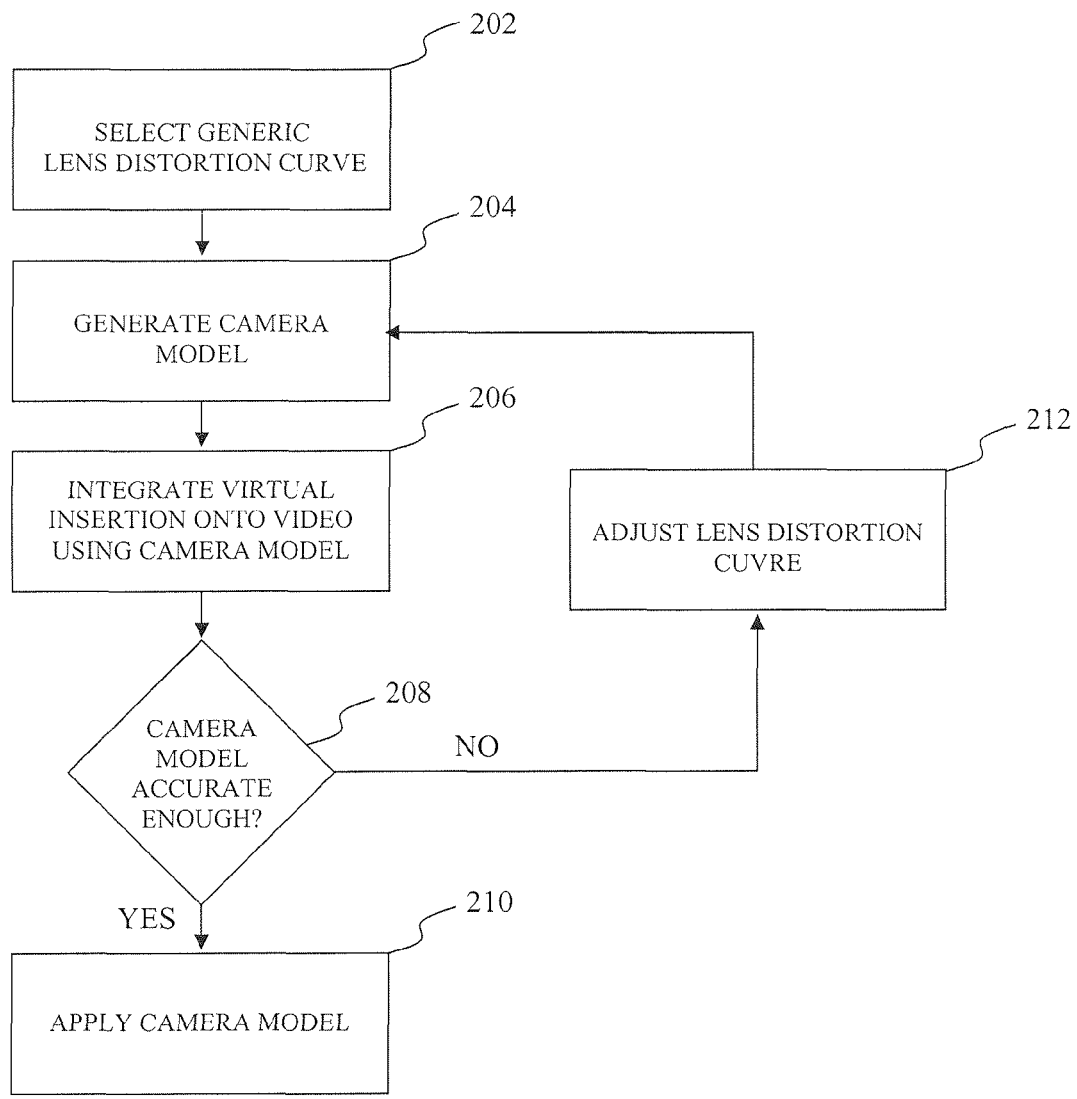
FIG. 2 illustrates a flowchart of exemplary operational steps of an iterative process to improve a generic lens distortion curve according to a first exemplary embodiment of the present invention.

The present invention improves these generic lens distortion curves through an iterative process to produce a camera model which better approximates the camera lens being used to capture the event. FIG. 2 illustrates a flowchart of exemplary operational steps of an iterative process to improve a generic lens distortion curve according to a first exemplary embodiment of the present invention. In this exemplary embodiment, the operational control flow uses the generic lens distortion curve as a seed to produce a camera model then adjusts the generic lens distortion curve to refine the camera model to better approximate the camera capturing the event. The invention is not limited to this operational description. Rather, it will be apparent to persons skilled in the relevant art(s) from the teachings herein that other operational control flows are within the scope and spirit of the present invention. The following discussion describes the steps in FIG. 2.

At step 202, the operational control flow selects a lens distortion curve, commonly referred to as a generic lens distortion curve, corresponding to a first camera lens or a family of camera lenses. The generic lens distortion curve may be selected right before and/or near live as an event is happening in real-time forgoing the conventional calibration of the camera lens that requires the use of calibration targets. The generic lens distortion curve represents a mathematical relationship of lens distortion for the first camera lens, or the family of camera lenses, which roughly approximates distortion caused by a second camera lens that is to be used by the broadcaster to capture the event onto video. For example, the second lens may be part of a family of camera lenses that may be characterized using a lens distortion curve that is common to the family of camera lenses. In this example, the operational control flow may select the lens distortion curve that is common to the family of lenses as the generic lens distortion curve. As another example, the second lens may share a common characteristic, such as a magnification factor to provide an example, of the first lens produced by the same or a different manufacturer. In this example, the operational control flow may select the lens distortion curve of the first lens having the common characteristic as the generic lens distortion curve. As a further example, the first lens may have been previously used to capture a prior event at the same or a different venue. In this example, the operational control flow may select the lens distortion curve used during this prior event as the generic lens distortion curve.

At step 204, the operational control flow generates a camera model using information that incorporates information from the generic lens distortion curve from step 202. As an example, the operational control flow determines one or more distortion constants for one or more magnification values from the generic lens distortion curve from step 202 and uses these distortion constants to remove distortion from the video.

The operational control flow may estimate one or more camera parameters relating to physical measurements of the camera such as pan, tilt, roll, image distance, x position, y position, z position, focus, lens distortion, magnification, and/or any other any other suitable parameter, or combination of parameters, that will be apparent to those skilled in the relevant art(s) without departing from the spirit and scope of the present invention from the undistorted video to generate the camera model.

At step 206, the operational control flow integrates one or more first virtual insertions onto the video captured by the camera before and/or during the event using the second lens using the camera model from step 204. The one or more first virtual insertions may represent virtual insertions that are to be integrated with the video before, during, and/or after the event and/or virtual insertions that are specially designated for step 206. For example, the one or more first virtual insertions may represent virtual graphics that are to be integrated with the video before, during, and/or after the event. As another example, the one or more first virtual insertions may represent virtual graphics such as basic geometric structures to provide an example, that are not to be integrated with the video before, during, and/or after the event. Rather, these virtual graphics are solely used for measuring a performance of the camera model from step 204.

At step 208, the operational control flow determines whether the camera model from step 204 is sufficiently accurate to present the realistic appearance of the virtual insertions from step 206 to the remote viewer. In an exemplary embodiment, the operational control flow performs a visual analysis of the video to determine whether the camera model from step 204 presents the realistic appearance of the virtual insertions from step 206 to the remote viewer. For example, when a sufficiently accurate camera model is used to integrate advertising logos on glass panels behind hockey goals in a video depicting a hockey contest, these logos will appear to be integral to the glass panels at the venue to the remote viewer. In this situation, the operational control proceeds to step 210. However, if the advertising logos on the glass panels behind the hockey goals in the video depicting the hockey contest appear to be unrealistic to the remote viewer, then the camera model from step 204 is not sufficiently accurate. For example, the advertising logos may appear beyond their intended location within the video and, consequentially, have an unrealistic appearance to the remote viewer. In this situation, the operational control proceeds to step 212. Determining realistic appearance of virtual insertions may be done with a human operator, video analysis, or a combination of the two.

At step 210, the operational control flow integrates one or more second virtual insertions onto the video captured by the camera before, during, and/or after the event using the second lens using the camera model from step 204.

At step 212, the operational control flow may adjust the lens distortion curve that was used to generate the camera model of step 204 based on appearance of the one or more first virtual insertions from step 206 with respect to the video. For example, an operator may determine that a distortion constant of the lens distortion curve is too low at a particular magnification value, also referred to as a zoom value, and the distortion constant may be increased for the particular zoom value. Knowledge of how to adjust distortion curves can be gained from experience. For example, it may be known that if a distortion constant is too low, virtual insertions at a particular venue will vary in a particular direction. Guidelines could be set by how much to vary distortion constants depending on observations. In many cases, experienced operators may be more sensitive to the effects of lens distortion curve errors than general viewers or even broadcasters and can prevent more serious errors occurring later in broadcasts by making fine adjustments during the broadcast.

Additionally, the generic lens distortion curves may be improved by the operators applying correction factors such as scale and offsets to distortion curves or parts of distortion curves. For example, it may be known that lenses for a broadcast will be selected from among multiple lenses in a broadcast truck inventory and that the lens distortion curves differ in known ways according to scale or offset factors. The operator may select a generic lens distortion curve in step 202 and apply correction factors to optimize or tune a performance of that lens being used to capture the event in step 212. A range of parameters may be tested covering the range of possible lens types. Varying parameters and evaluating results in this way may be more time efficient or logistically easier to do than more rigorous lens distortion calibrations. For many applications, even though rigorous lens distortion calibrations may yield more accurate results, viewers may not discern a noticeable difference in performance. In some cases, operators may select correction factors such as a curve gain to provide an example, at the beginning of the event and make further adjustments during the event or during pauses of the event such as during commercial breaks to provide an example.

In a particular example, an operator may arrive at a broadcast studio a relatively short time before a basketball contest. The operator may learn that the production is using a model 75× lens to capture the basketball contest onto video and select a generic lens distortion curve based on manufacturer's data for a related model 70× lens. The lens distortion curve may represent a graph showing a lens distortion constant as a function of magnification. The operator may receive a short video sequence before the basketball contest containing representative framing that will be used during the broadcast. The operator may evaluate the lens distortion curve using the video sequence by inserting a virtual insertion, such as advertising logo to provide an example, into a scene of the basketball contest depicted on the video sequence. The operator observes the video integrated with the virtual insertion to determine a performance of the lens distortion curve. The operator may observe that the virtual insertion moves in the scene relative to a background in a manner which indicates excessive distortion curve gain for example. After uniformly reducing gain, the performance of the lens distortion curve may improve but the operator may observe residual motion relative to the background at a particular magnification. The operator may then reduce the distortion constant amplitude at that particular magnification and software may then interpolate along the lens distortion curve to smooth it. Subsequent testing may show adequate performance of the lens distortion curve. Later during the game, the operator may notice slight movement of the virtual insertion at another magnification and make further adjustments accordingly. Further, the generic lens distortion curves may be improved through an iterative process to produce a camera model which better approximates the camera lens being used to capture the event.

Figure 3:
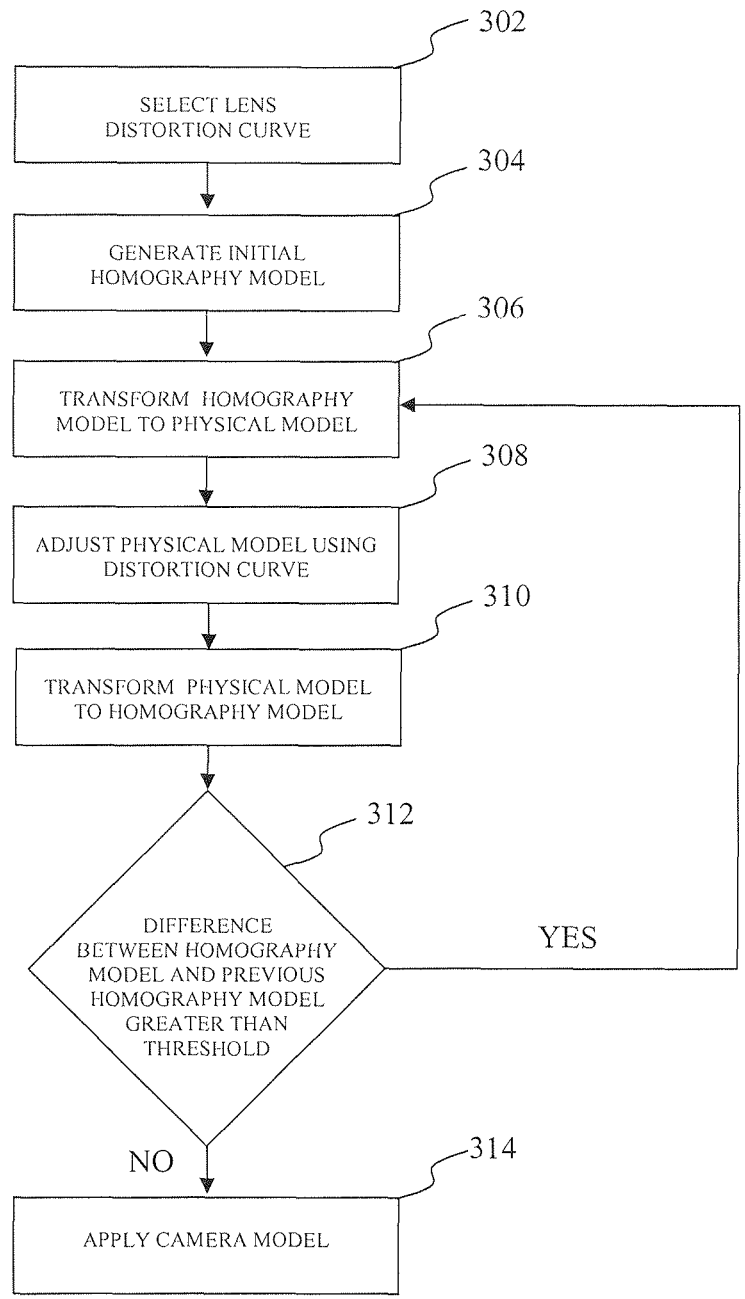
FIG. 3 illustrates a flowchart of exemplary operational steps of an iterative process to improve a lens distortion curve near live as an event is happening in real-time, or after the event is complete, according to a first exemplary embodiment of the present invention.

FIG. 3 illustrates a flowchart of exemplary operational steps of an iterative process to improve a lens distortion curve near live as an event is happening in real-time, or after the event is complete, according to a first exemplary embodiment of the present invention. The invention is not limited to this operational description. Rather, it will be apparent to persons skilled in the relevant art(s) from the teachings herein that other operational control flows are within the scope and spirit of the present invention. The following discussion describes the steps in FIG. 3.

At step 302, the operational control flow receives a lens distortion curve that roughly approximates distortion caused by a lens of a camera capturing an event onto video. The lens distortion curve may represent the generic lens distortion curve as discussed in step 202 of FIG. 2 or lens distortion curve that provides the camera model that is sufficiently accurate to present the realistic appearance of virtual insertions to the remote viewer as discussed in step 208 of FIG. 2.

At step 304, the operational control flow generates an initial homography model of the scene being captured by the camera using a known homography method such as homography based on keypoints or any other suitable homography method, or combination of homography methods, that will be apparent to those skilled in the relevant art(s) without departing from the spirit and scope of the present invention.

At step 306, the operational control flow transforms a homography model, such as the homography model from step 304 to provide an example, to a real-world physical model. The operational control flow may estimate one or more real-world parameters relating to physical measurements of the camera such as pan, tilt, roll, image distance, x position, y position, z position, focus, magnification, and/or any other any other suitable parameter, or combination of parameters, that will be apparent to those skilled in the relevant art(s) without departing from the spirit and scope of the present invention from the homography model from step 304 to generate a camera model.

At step 308, the operational control flow adjusts the real-world physical model from step 306 using the lens distortion curve from step 302. The operational control flow may adjust the real-world physical model and/or the camera model from step 306 using one or more parameters from the lens distortion curve of step 302, such as a distortion constant, and/or any other any other suitable parameter, or combination of parameters, that will be apparent to those skilled in the relevant art(s) without departing from the spirit and scope of the present invention.

At step 310, the operational control flow transforms the real-world physical model from step 308 to a homography model. The operational control flow uses the one or more camera parameters from the camera model from step 308 to generate the homography model. The operational control flow may use the known homography method used by step 304 to generate the homography model or any other suitable homography method that will be apparent to those skilled in the relevant art(s) without departing from the spirit and scope of the present invention.

At step 312, the operational control flow compares the homography model from step 310 to a previous homography model, such as the initial homography model from step 304 to provide an example. If a difference between these two homography models is greater than the threshold, the operational control flow reverts to step 306. Else, the operational control flow proceeds to step 314.

At step 314, the operational control flow uses the camera model from step 308 in a virtual insertion system, such as the virtual insertion system 100 to provide an example, to integrate virtual insertions into the video.

Figure 4:
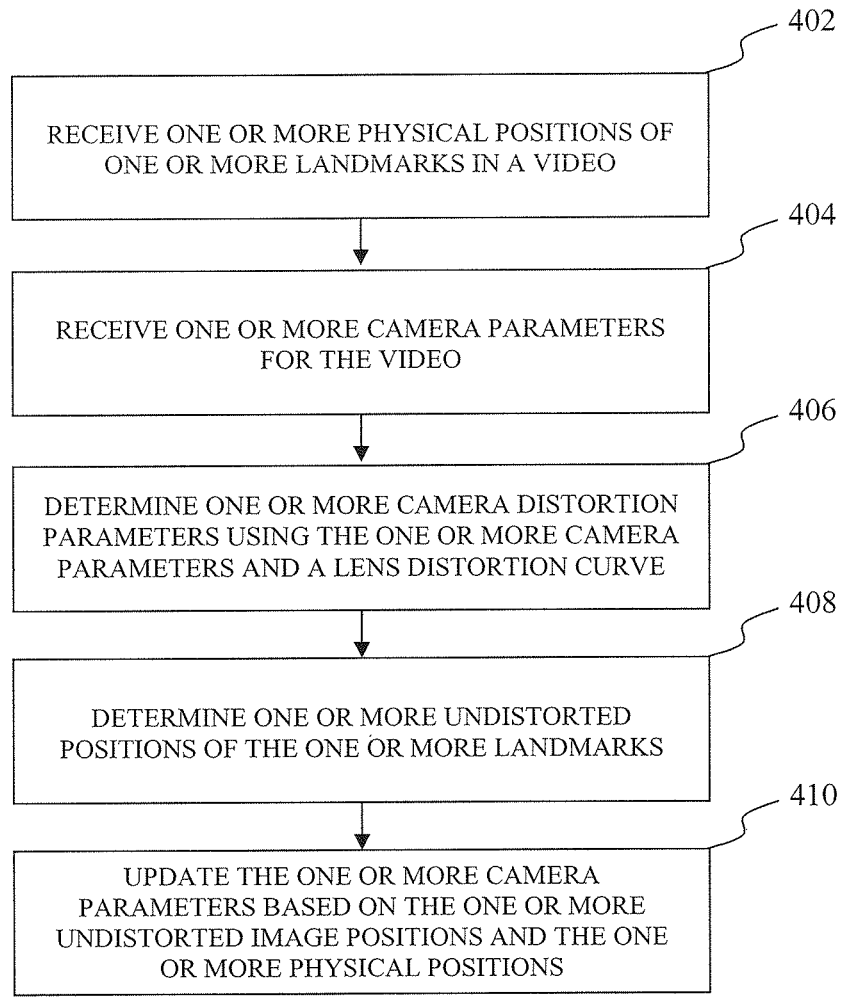
FIG. 4 illustrates a second flowchart of exemplary operational steps of an iterative process to improve a generic lens distortion curve according to a second exemplary embodiment of the present invention.

FIG. 4 illustrates a second flowchart of exemplary operational steps of an iterative process to improve a generic lens distortion curve according to a second exemplary embodiment of the present invention. The invention is not limited to this operational description. Rather, it will be apparent to persons skilled in the relevant art(s) from the teachings herein that other operational control flows are within the scope and spirit of the present invention. The following discussion describes the steps in FIG. 4.

At step 402, the operational control flow receives one or more physical positions of one or more landmarks in a video. Alternatively, the operational control flow may determine the physical positions of the one or more landmarks. Landmarks represent any physically recognizable object or feature of an object with the scene. For example, the one or more landmarks may represent lines or additional markings on a basketball court. The one or more landmarks may be defined using known recognition methods using template, keypoint, and/or any other suitable recognition method that will be apparent to those skilled in the relevant art(s) without departing from the spirit and scope of the present invention. The one or more physical positions of the one or more landmarks may be represented in three dimensional physical coordinates or a two dimensional position on a surface in the three dimensional world, such as a relative position on the plane of a basketball court to provide an example. However, this example is not limiting, those skilled in the relevant art(s) will recognize that any other suitable single or multi-dimensional representation may be used without departing from the spirit and scope of the present invention.

At step 404, the operational control flow receives one or more camera parameters, such as pan, tilt, roll, image distance, x position, y position, z position, focus, and/or magnification to provide some examples, for the video. Alternatively, the operational control flow may estimate the one or more camera parameters based upon the physical positions of the one or more landmarks from step 402. The estimates of the one or more camera parameters may represent one or more arbitrary values, one or more values determined through empirical analysis of camera usage, one or more previous iterations of the search process to be described below in step 410, and/or any combination thereof. In an exemplary embodiment, the estimates for the zoom value of the camera may include image distance, lens focal length, magnification, lens field of view, and/or a normalized value between the minimum and maximum zoom to provide some examples.

At step 406, the operational control flow determines one or more camera lens distortion parameters using the one or more camera parameters from step 404 and/or a lens distortion curve that approximates a lens of a camera capturing the event.

At step 408, the operational control flow determines one or more undistorted image positions of the one or more landmarks from step 402, one or more other landmarks in the video, and/or any combination thereof in the video. The operational control flow may first determine one or more distorted image positions of these landmarks using the estimates of one or more camera parameters from step 404 as part of any suitable image processing technique that will be apparent to those skilled in the relevant art(s) without departing from the spirit and scope of the present invention. The one or more undistorted image positions may then be determined by adjusting the one or more distorted image positions using the camera lens distortion parameter from step 406. The one or more undistorted image positions may be defined as one or more coordinates in the image, or more broadly viewed as one or more positions on the sensor capturing the image, or one or more corresponding angle in the camera field of view corresponding to one or more positions on the sensor capturing the image.

At step 410, the operational control flow updates the one or more camera parameters from step 404 based on the one or more physical positions from step 402 and/or the one or more undistorted image positions from step 408. In an exemplary embodiment, a magnification value, also referred to as a zoom value, for the camera is determined through the direct association of undistorted image positions from step 408 and their corresponding physical position from step 402.

In this exemplary embodiment, the zoom value may be part of a more complicated camera model that containing additional parameters such as pan, tilt, roll, image distance, x position, y position, z position, focus, sensor pixel size, aspect ratio, and/or any other suitable parameter that will be apparent to those skilled in the relevant art(s) without departing from the spirit and scope of the present invention. The operational control flow may first determine a homographic mapping between image positions and a fixed plane in the physical world, such as a ground plane depicted in the video. In another exemplary embodiment, step 406 through step 410 form an iterative process whereby the values for the one or more camera parameters from step 410 are used as the estimates of the one or more camera parameters in step 406. This iterative process continues until there is no more significant updating of the values for the one or more camera parameters of step 410 as determined by a model difference threshold similar to the threshold of step 210 to provide an example.

In an exemplary embodiment, the operational control flow may determine the values for the one or more camera parameters using a search analysis of a single image or a window of images. These values not need to rely on information extracted from multiple images immediately preceding or succeeding a window in the sequence. This is appropriate for cases where there is a discontinuity in the video sequence, such as produced by transitioning between cameras in a production. In another exemplary embodiment, a track process updates the values for the one or more camera parameters for successive frames until after a search process succeeds. An exemplary search process is given in U.S. patent application Ser. No. 12/659,628, filed on Mar. 15, 2010, which is incorporated by reference; however any suitable search process may be used that will be apparent to those skilled in the relevant art(s) without departing from the spirit and scope of the present invention. It is envisioned that the search process may succeed in the middle of a sequence, and the tracking process may update camera models both forward and backwards in time.

The operational control flow also provides for a level of automation in determining the distortion modeling. Numerous landmarks on the playing surface or within the spectator area in a broadcast camera's field of view at wider zooms. This operational control flow may use the known geometric markings of the playing surface alone or in combination with alternate locations to estimate distortion parameters for a specific image zoom. Software packages are readily available (such as OpenCV) which may directly computing a complex camera model including distortion. The estimation at a particular zoom may be used in turn to refine the lens distortion curve in the vicinity of the camera zoom. In cases that limited distortion measurements are available, a gain or offset may be applied to manufacturer provided curves, as in the operator corrected method discussed above.

Figure 5:
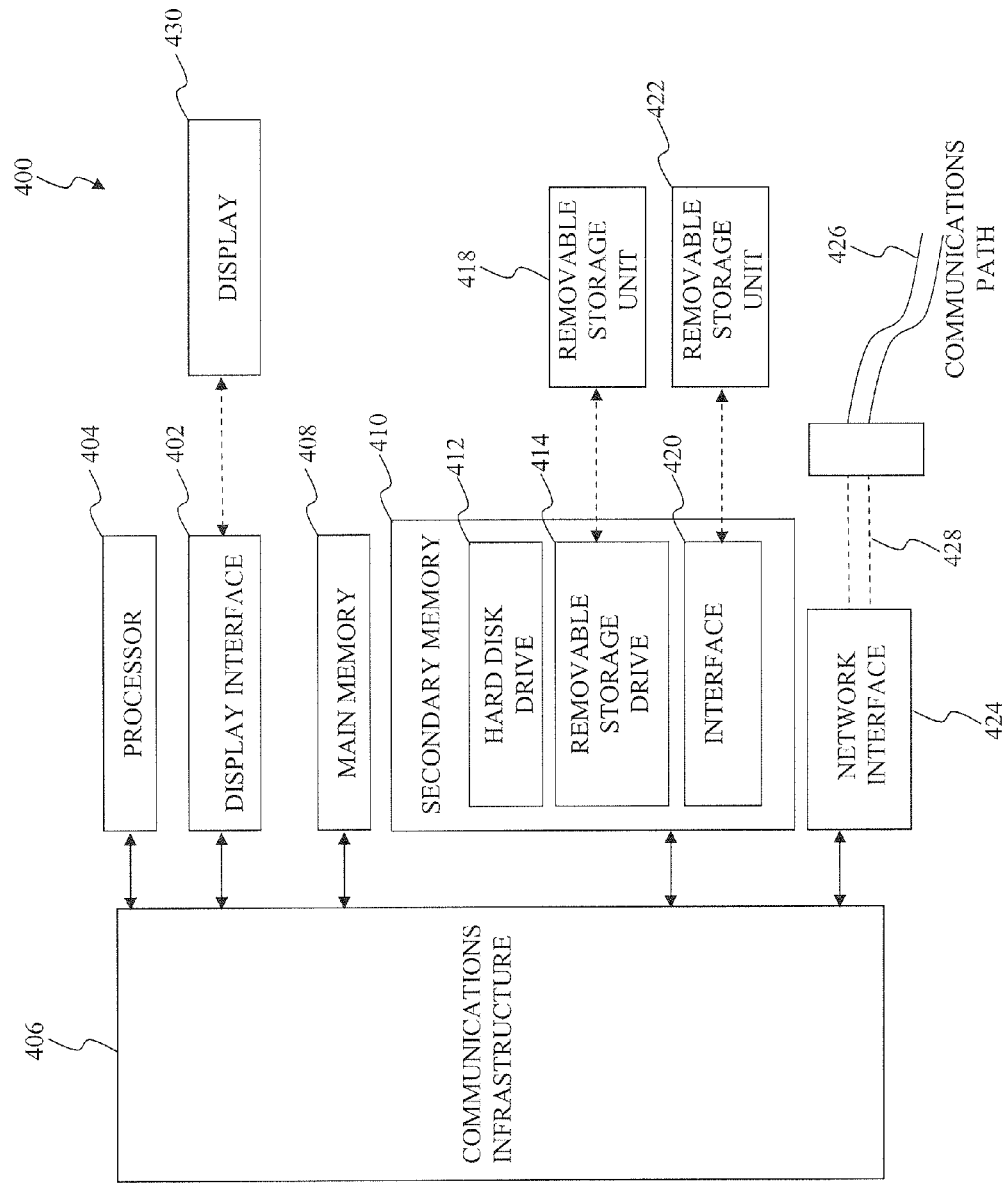
FIG. 5 is a schematic diagram of an exemplary computer system according to an exemplary embodiment of the present invention.

FIG. 5 is a schematic diagram of an exemplary computer system 500 according to an exemplary embodiment of the present invention. Various aspects of the various embodiments as discussed above can be implemented by software, firmware, hardware, or a combination thereof. FIG. 5 illustrates an example computer system 500 in which an embodiment, or portions thereof, can be implemented as computer-readable code. Various embodiments are described in tennis of this example computer system 500. After reading this description, it will become apparent to a person skilled in the relevant art how to implement embodiments using other computer systems and/or computer architectures.

Computer system 500 includes one or more processors, such as processor 504. Processor 504 can be a special purpose or a general purpose processor. Processor 504 is connected to a communication infrastructure 506 (for example, a bus or network).

Computer system 500 also includes a main memory 508, preferably random access memory (RAM), and may also include a secondary memory 510. Secondary memory 510 may include, for example, a hard disk drive 512 and/or a removable storage drive 514. Removable storage drive 514 may comprise a floppy disk drive, a magnetic tape drive, an optical disk drive, a flash memory, or the like. The removable storage drive 514 reads from and/or writes to a removable storage unit 518 in a well known manner. Removable storage unit 518 may comprise a floppy disk, magnetic tape, optical disk, etc. which is read by and written to by removable storage drive 514. As will be appreciated by persons skilled in the relevant art(s), removable storage unit 518 includes a tangible computer readable storage medium having stored therein computer software and/or data.

Alternatively, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 may also include a communications interface 524. Communications interface 524 allows software and data to be transferred between computer system 500 and external devices. Communications interface 524 may include a modem, a network interface (e.g., an Ethernet card), a communications port, a PCMCIA slot and card, or the like. Software and data transferred via communications interface 524 are provided to communications interface 524 via a communications path 526. Communications path 526 may be implemented using wire or cable, fiber optics, a phone line, a cellular phone link, a radio frequency (RF) link or other communications channels.

In this document, the terms "computer program medium" and "computer usable medium" are used to generally refer to media such as removable storage unit 518, removable storage unit 522, and a hard disk installed in hard disk drive 512. Computer program medium and computer usable medium can also refer to memories, such as main memory 508 and secondary memory 510, which can be memory semiconductors (e.g. DRAMs, etc.). These computer program products are means for providing software to computer system 500.

Computer programs (also called computer control logic) are stored in main memory 508 and/or secondary memory 510. Computer programs may also be received via communications interface 524. Such computer programs, when executed, enable computer system 500 to implement embodiments as discussed herein, such as the system described above. In particular, the computer programs, when executed, enable processor 504 to implement the processes of embodiments. Accordingly, such computer programs represent controllers of the computer system 500. Where embodiments are implemented using software, the software may be stored in a computer program product and loaded into computer system 500 using removable storage drive 514, interface 520, hard drive 512 or communications interface 524.

CONCLUSION

While various embodiments of the present invention have been described above, it should be understood that they have been presented by way of example, and not limitation. It will be apparent to persons skilled in the relevant art that various changes in form and detail can be made therein without departing from the spirit and scope of the invention.

The breadth and scope of the present invention should not be limited by any of the above-described exemplary embodiments, but should be defined only in accordance with the following claims and their equivalents.

What is claimed is:

1. A method of modeling lens distortion for a camera lens used to capture video of an event, comprising:
   (a) selecting a lens distortion curve, the lens distortion curve including a plurality of camera lens distortion parameters, wherein calibration of the camera lens using calibration targets is not performed;
   (b) generating a camera model based upon the lens distortion curve;
   (c) integrating one or more first virtual insertions onto the video using the camera model; and
   (d) applying a correction factor including scale, offset and curve gain to the one or more camera lens distortion parameters to adjust the lens distortion curve, wherein the correction factor is determined based on a realistic appearance of the virtual insertion with respect to the video, wherein the realistic appearance is when the virtual insertion appears to be rationally integrated onto the video to a remote viewer.

2. The method of claim 1, wherein step (a) comprises:
   (a)(i) selecting a further lens distortion curve corresponding to a further camera lens as the lens distortion curve, the further camera lens being different from the camera lens.

3. The method of claim 2, wherein the camera lens and the further camera lens share common characteristic.

4. The method of claim 1, wherein the camera lens is from among a family of camera lenses, and wherein step (a) comprises:
   (a)(i) selecting a second lens distortion curve corresponding to the family of camera lenses as the lens distortion curve.

5. The method of claim 1, wherein the camera lens was previously used to capture a prior event, and where step (a) comprises:
   (a)(i) selecting a second lens distortion curve used during the prior event as the lens distortion curve.

6. The method of claim 1, wherein step (a) comprises:
   (a)(i) selecting the lens distortion curve right before the event is to begin.

7. The method of claim 1, wherein step (b) comprises:
   (b)(i) generating the camera model based upon the lens distortion curve and an automated visual analysis of the video.

8. The method of claim 1, wherein step (b) comprises:
   (b)(i) determining one or more camera lens distortion parameters using one or more camera parameters and the lens distortion curve;
   (b)(ii) determining one or more undistorted image positions of one or more landmarks in the video; and
   (b)(iii) updating the one or more camera parameters based on the undistorted image positions and one or more physical positions of the one or more landmarks.

9. The method of claim 8, wherein step (b)(ii) comprises:
   (b)(ii)(A) determining one or more distorted image positions of the one or more landmarks; and
   (b)(ii)(B) determining the one or more undistorted image positions from the one or more distorted image positions by adjusting the one or more distorted image positions using the one or more camera lens distortion parameters.

10. The method of claim 1, wherein step (c) comprises:
    (c)(i) integrating the one or more first virtual insertions onto the video at a location that is remote to a venue hosting the event.

11. The method of claim 1, wherein step (d) comprises:
    (d)(i) performing a visual analysis of the video to determine whether the camera model is sufficiently accurate to present a realistic appearance of the one or more first virtual insertions to a remote viewer; and
    (d)(ii) adjusting the lens distortion curve when the camera model is not sufficiently accurate.

12. The method of claim 11, wherein step (d)(i) comprises:
    (d)(i)(A) designating the camera model as sufficiently accurate when the one or more first virtual insertions appear within their intended location.

13. The method of claim 11, wherein step (d)(i) comprises:
    (d)(i)(A) designating the camera model as sufficiently accurate when the one or more first virtual insertions appear integral to a scene depicted by the video.

14. The method of claim 11, further comprising:
    (e) repeating steps (b) through (d) until the camera model is sufficiently accurate to present the realistic appearance.

15. A non-transitory electronic-readable medium having embodied thereon a program, the program being executable by a computer system to perform instructions for modeling lens distortion for a camera lens used to capture video of an event, the instructions comprising:
    instructions for selecting a lens distortion curve, the lens distortion curve including a plurality of camera lens distortion parameters;
    instructions for generating a camera model based upon the lens distortion curve;
    instructions for integrating one or more first virtual insertions onto the video using the camera model; and
    instructions for applying a correction factor including scale, offset and curve to the one or more camera lens distortion parameters to adjust the lens distortion curve, wherein the correction factor is determined based on a realistic appearance of the virtual insertion with respect to the video, wherein the realistic appearance is when the virtual insertion appears to be rationally integrated onto the video to a remote viewer.

16. The non-transitory electronic-readable medium of claim 15, wherein the instructions for selecting comprise:
    instructions for selecting a further lens distortion curve corresponding to a further camera lens as the lens distortion curve, the further camera lens being different from the camera lens.

17. The non-transitory electronic-readable medium of claim 16, wherein the camera lens and the further camera lens share common characteristic.

18. The non-transitory electronic-readable medium of claim 15, wherein the camera lens is from among a family of camera lenses, and wherein the instructions for selecting comprise:
instructions for selecting a second lens distortion curve corresponding to the family of camera lenses as the lens distortion curve.

19. The non-transitory electronic-readable medium of claim 15, wherein the camera lens was previously used to capture a prior event, and where instructions for selecting comprise:
instructions for selecting a second lens distortion curve used during the prior event as the lens distortion curve.

20. The non-transitory electronic-readable medium of claim 15, wherein instructions for selecting comprise:
instructions for selecting the lens distortion curve right before the event is to begin.

21. The non-transitory electronic-readable medium of claim 15, wherein instructions for generating comprise:
instructions for generating the camera model based upon the lens distortion curve and an automated visual analysis of the video.

22. The non-transitory electronic-readable medium of claim 15, wherein instructions for generating comprise:
instructions for determining one or more camera lens distortion parameters using one or more camera parameters and the lens distortion curve;
instructions for determining one or more undistorted image positions of one or more landmarks in the video; and
instructions for updating the one or more camera parameters based on the undistorted image positions and one or more physical positions of the one or more landmarks.

23. The non-transitory electronic-readable medium of claim 22, wherein the instructions for determining the one or more undistorted image positions comprise:
instructions for determining one or more distorted image positions of the one or more landmarks; and
instructions for determining the one or more undistorted image positions from the one or more distorted image positions by adjusting the one or more distorted image positions using the one or more camera lens distortion parameters.

24. The non-transitory electronic-readable medium of claim 15, wherein the instructions for integrating comprise:
instructions for integrating the one or more first virtual insertions onto the video at a location that is remote to a venue hosting the event.

25. The non-transitory electronic-readable medium of claim 15, further comprising:
instructions for performing a visual analysis of the video to determine whether the camera model is sufficiently accurate to present a realistic appearance of the one or more first virtual insertions to a remote viewer; and
instructions for adjusting the lens distortion curve when the camera model is not sufficiently accurate.

26. The non-transitory electronic-readable medium of claim 24, wherein instructions for performing comprise:
instructions for designating the camera model as sufficiently accurate when the one or more first virtual insertions appear within their intended location.

27. The non-transitory electronic-readable medium of claim 24, wherein the instructions for designating comprise:
instructions for designating the camera model as sufficiently accurate when the one or more first virtual insertions appear integral to a scene depicted by the video.

28. The non-transitory electronic-readable medium of claim 25, further comprising:
instructions for repeating the instructions for generating, the instructions for integrating, and the instructions for adjusting until the camera model is sufficiently accurate to present the realistic appearance.

\* \* \* \* \*